United States Patent
Lindsay et al.

(10) Patent No.: US 7,142,006 B2
(45) Date of Patent: *Nov. 28, 2006

(54) DEVICE AND METHOD TO CAUSE A FALSE DATA VALUE TO BE CORRECTLY SEEN AS THE PROPER DATA VALUE

(75) Inventors: Dean T. Lindsay, Milpitas, CA (US); Wayne C. Ashby, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 104 days.

This patent is subject to a terminal disclaimer.

(21) Appl. No.: 10/640,538

(22) Filed: Aug. 13, 2003

(65) Prior Publication Data

US 2004/0046587 A1    Mar. 11, 2004

Related U.S. Application Data

(63) Continuation of application No. 10/154,329, filed on May 23, 2002, now Pat. No. 6,677,778.

(51) Int. Cl.
  *H03K 17/16*  (2006.01)
(52) U.S. Cl. .............. 326/30; 326/32; 326/33; 326/21
(58) Field of Classification Search ............ 326/30–34, 326/21–22
See application file for complete search history.

(56) References Cited

U.S. PATENT DOCUMENTS

| | | | | |
|---|---|---|---|---|
| 5,457,406 A | * | 10/1995 | Takada et al. | 326/30 |
| 5,534,812 A | | 7/1996 | Cao et al. | |
| 5,686,872 A | | 11/1997 | Fried et al. | |
| 6,218,854 B1 | | 4/2001 | Ko | |
| 6,486,696 B1 | * | 11/2002 | Cao | 326/30 |
| 2003/0201790 A1 | * | 10/2003 | Rajan et al. | 326/30 |

OTHER PUBLICATIONS

U.S. Appl. No. 10/154,329, no date, Lindsay et al.

* cited by examiner

*Primary Examiner*—Anh Q. Tran

(57) ABSTRACT

The present invention is a device and method to change the reflection time of a bidirectional signal so as to cause a false data value to be correctly seen as the proper data value when the bidirectional signal travels between a first semiconductor chip and a second semiconductor chip, through a transmission line between the two semiconductor chips. The reflection time is adjusted by coupling an electrical network to the transmission line to cause an early electrical reflection. In one embodiment, the network is coupled to establish an impedance discontinuity between the board trace and the package trace.

18 Claims, 2 Drawing Sheets

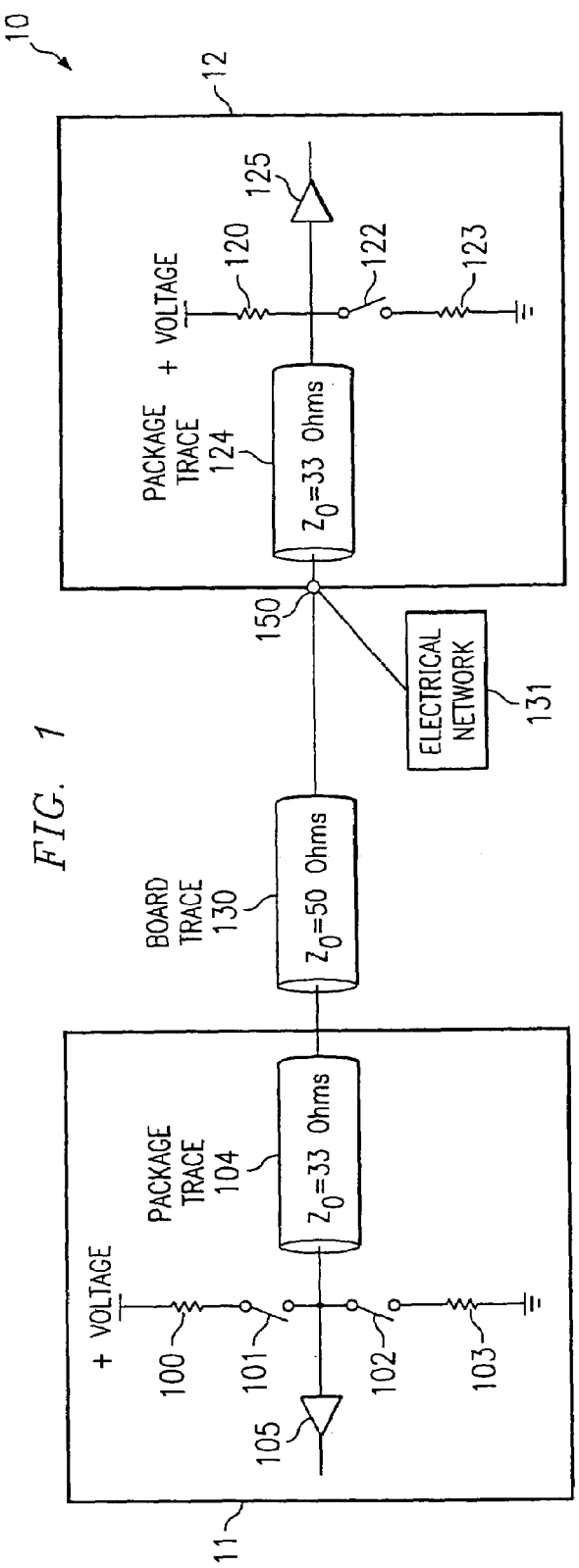
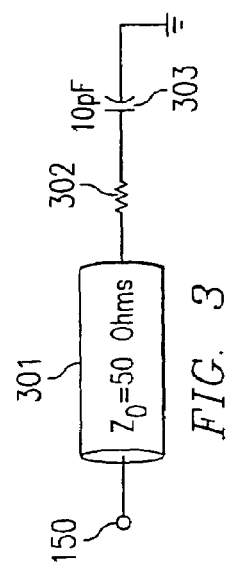

DEVICE AND METHOD TO CAUSE A FALSE DATA VALUE TO BE CORRECTLY SEEN AS THE PROPER DATA VALUE

RELATED APPLICATIONS

This application is a continuation of commonly-assigned application Ser. No. 10/154,329, entitled "DEVICE AND METHOD TO CAUSE A FALSE DATA VALUE TO BE CORRECTLY SEEN AS THE PROPER DATA VALUE," filed on May 23, 2002, now U.S. Pat. No. 6,677,778 the disclosure of which is hereby incorporated herein by reference.

FIELD OF THE INVENTION

The invention pertains to bidirectional data flow along a transmission line between a first semiconductor chip and a second semiconductor chip.

BACKGROUND OF THE INVENTION

Problems can occur in high-speed bidirectional buses between two semiconductor chips when the transmission line electrical length exceeds the rise-time or fall-time of the signal. Setup times may not be met for the first bit received after a bus turnaround. The problem arises when the bus electrical design is such that the same electrical condition is used both for termination of the bus in its characteristic impedance and for driving one of the two logic levels. With buses of this design, when a bus turnaround occurs, the driving chip which is relinquishing the bus turns off its output driver and turns on its terminator, and the chip which is taking over the bus turns on its output driver.

When one chip drives the bus at the non-terminating electrical level (for example, a zero) and relinquishes the bus, at the end of its last bit time, the former driving chip will turn on its bus termination in preparation for receiving signals from the other chip. Since the same electrical condition is used both for termination of the bus in its characteristic impedance and for driving one of the logic levels, the chip that is relinquishing the bus actually drives an electrical signal transition (for example, from a zero to a one) down the bus during the transition period. This signal can be thought of as a transitional value. If the new bus master chip drives the opposite logic level (for example, a zero) during this transition time, the value driven by the new chip will not be seen at the relinquishing chip in time to be properly detected. This is because the relinquishing chip continues to see the transitional value that it is driving until that transitional value travels to the new bus driver and is reflected back to the relinquishing chip.

The length of the transmission time between the chips determines the length of time the relinquishing chip will receive the transition value and, therefore, the time during which it will be unable to detect the correct value from the new driving chip.

Prior solutions to this problem have been to shorten the distance between the two semiconductor chips or to slow down the clock to ensure the data arrives timely and accurately. For example, the clock could be slowed down to around 440 megahertz versus the more ideal operating frequency of 500 megahertz.

Another prior solution involves reducing the delay associated with the circuit logic through which the signal travels.

Another prior solution is to add an idle cycle as the first bus cycle after bus turnaround, thus ignoring bus activity during this cycle at the expense of decreased performance.

BRIEF SUMMARY OF THE INVENTION

The present invention is a device and method for causing a false logical "one" to be correctly seen as a logical "zero" when a bidirectional signal travels between a first semiconductor chip and a second semiconductor chip, through a transmission line placed between the two semiconductor chips, by coupling an electrical network to the transmission line to cause an early electrical reflection.

BRIEF DESCRIPTION OF THE DRAWINGS

For a more complete understanding of the present invention, reference is now made to the following descriptions taken in conjunction with the accompanying drawing, in which:

FIG. 1 is a schematic of two semiconductor chips connected by a transmission line according to an embodiment of the present invention;

FIGS. 2 and 3 show different embodiments of an electrical network connected to the transmission line;

DETAILED DESCRIPTION OF THE INVENTION

Figure 4:
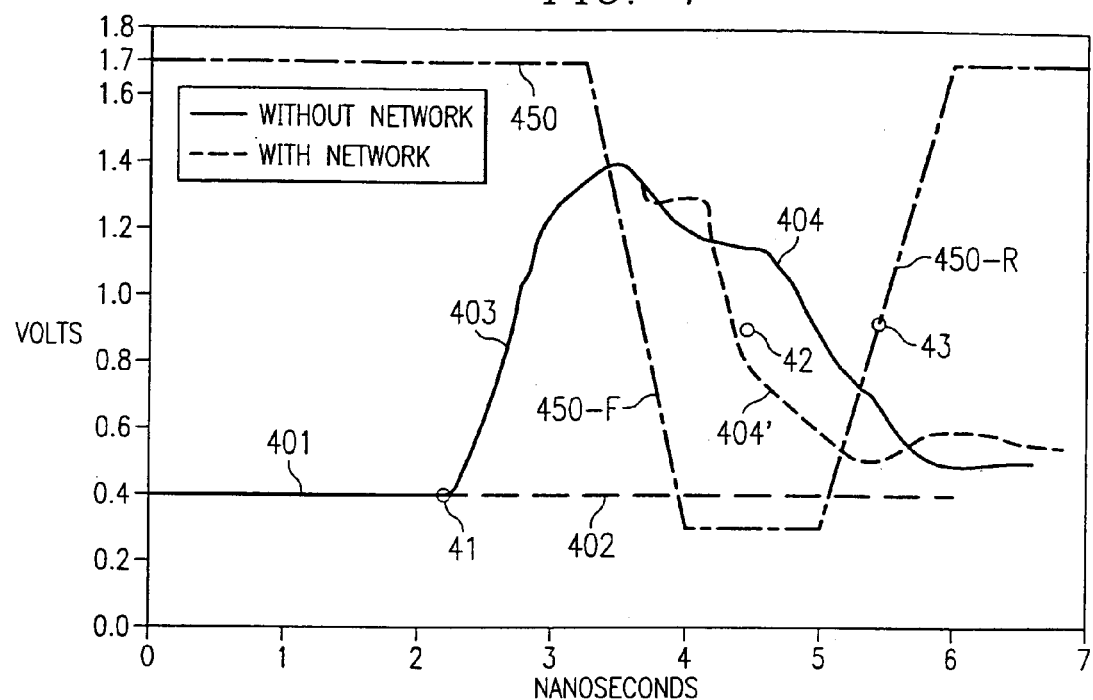
FIG. 4 shows the glitch waveform and the modified glitch waveform at the input of the receiver of the first semiconductor chip for "0" to "0" situations.

FIG. 1 shows a schematic view of system 10 wherein the situation being described is shown. A transmission line glitch is launched from first semiconductor chip 11 as it changes from being bus master to receiver. This glitch is the transition voltage value from chip 11, and its reflection from chip 12, as will be discussed below. As bus master, chip 11 had been driving a low (i.e. zero) signal onto transmission line 130 which may be, for example, a (board trace) via transmission line portion 104 (which may be, for example, a chip package trace).

The change from master to receiver occurs when chip 11 turns off its pull-down resistor 103 by opening switch 102 and turns on its pull-up resistor 100 by closing switch 101. This serves to terminate the bus at chip 11's end. Switch 101 closing causes a rising edge (i.e. a logical one or a high signal) to travel down the transmission line from first chip 11 toward second chip 12.

Meanwhile, chip 12 (which has now become bus master) starts to pull down to zero through its pull-down resistor 123 by closing switch 122. Prior to switch 122 closing, current was already flowing through pull-up resistor 120 and out of the chip via trace 124. However, transmission line 124 (which may be a package trace on chip 12) was already at a low voltage from the logical zero that had been on the line before switch 102 opened. As a result, no change in voltage appears on transmission line 130 between chips 11 and 12 for this event.

When the rising edge from chip 11 (switch 101 closing) arrives at chip 12, there is a low at the input of receiver 125 caused by switch 122 closing. This low, in conjunction with the impedance discontinuity between board trace 130 and package trace 124, causes a reflection to be returned along the transmission line toward chip 11, forcing the bus to a low voltage. The glitch from chip 11 ends when the negative reflection from chip 12 arrives back at the input of receiver 105, causing a low level to exist over the length of the transmission path 124, 130 and 104 caused by the closing of switch 122.

The width of the glitch is set by the round-trip time of the interconnect 124, 130 and 104. If the round trip time is too long, the first bit sent by chip 12 will not be detected because (as will be discussed) the setup time is too short due to the effect of the glitch on chip 11's signal detector.

If the total interconnect length (chip, package and board trace lengths) of the bidirectional signal is short enough, the glitch will have ended and the signal will have reached its final intended value before chip 11 samples the bit. However, when the total interconnect length exceeds approximately Tr times V/2, where Tr is the rise or fall time of the signal and V is the velocity of propagation along the signal trace, the glitch width is too long and will interfere with the ability of chip 11 to correctly receive the first bit sent by chip 12.

This problem can be overcome by shortening the total interconnect length between the chips by a sufficient amount. However, shortening the interconnect length may be impractical due to the congested chip and board layouts.

The glitch can be made narrower if the reflection ending the glitch can be made to arrive at chip 11 earlier than it would normally arrive. This has the effect of shortening the width of the turnaround glitch so that setup time (as will be discussed) is sufficient for the first bit from chip 12 to be properly detected.

An important realization is that as the glitch propagates from chip 11 toward chip 12, the signal is already low at chip 12. By adding an impedance discontinuity, in the form of network 131, the glitch can be made to reflect back toward chip 11 "early". This early reflection will arrive at chip 11 sooner than it would have had network 131 not been present, since the glitch would have to travel further before being reflected at switch 122. This early reflection reduces the glitch width, as determined at chip 11, thereby allowing a longer setup time so as to allow the first zero bit from chip 12 to be correctly recognized. Node 150 should be positioned at a location that minimizes reflections when chip 12 transitions to receive and that produces an earlier reflection sufficient to shorten the glitch when chip 11 transitions to receive.

FIG. 2 shows one embodiment of electrical network 131 in which 22 pF capacitor 250 is connected to ground and to terminal 150. This embodiment provides approximately 600 psec of additional setup time by shortening the glitch by 600 psec due to the early negative reflection from the capacitor.

A second embodiment of network 131, as shown in FIG. 3, uses a 326 psec long 50 ohm transmission line stub 301 that is connected to terminal 150 and that is grounded through 50 ohm resistor 302 and 10 pF capacitor 303. The 50 ohm 326 psec transmission line stub, 50 ohm resistor and 10 pF capacitor are optimal values for the present invention, although others may be used, depending on the impedance, edge rate and length of the transmission line. The reflection occurs as the glitch's rising edge encounters the impedance discontinuity caused by the connection of network 131. The energy transferred to the stub is absorbed by resistor 302, preventing an undesirable secondary reflection from the end of the stub from perturbing the signal on the interconnect traces 130, 104, and 124. A 10 pF capacitor 303 prevents the termination resistor from drawing DC current after the transient wavefront has passed. Compared to the single capacitor embodiment, this embodiment has the advantage that network 131 components may be located a distance from the transmission line where they may be placed more easily. Also, the reflections off of the stub are less severe than those from the capacitor of FIG. 2.

Electrical network 131 also causes reflections when chip 12 drives the transmission line. However, especially when using the embodiment of FIG. 3, these reflections alter the signal waveform less than when chip 11 drives the transmission line. This is in part because package trace 104 from chip 11 is a 33 ohm transmission line. The mismatch between the driving 33 ohm line and the 50 ohm board trace in parallel with the 50 ohm stub (FIG. 3) is less than when the 50 ohm board trace drives the 33 ohm package trace in parallel with the 50 ohm stub. Thus, the reflection is smaller when chip 12 drives than it is when chip 11 drives. Also, the reflection node is closer to the signal source, thus the reflection time is shorter, which creates a less significant effect on the signal.

Note that while impedance 130 is 50 ohms and impedance 124 is 33 ohms, these impedance's could be any relative magnitude and a reflection will occur where a discontinuity exists.

Figure 5:
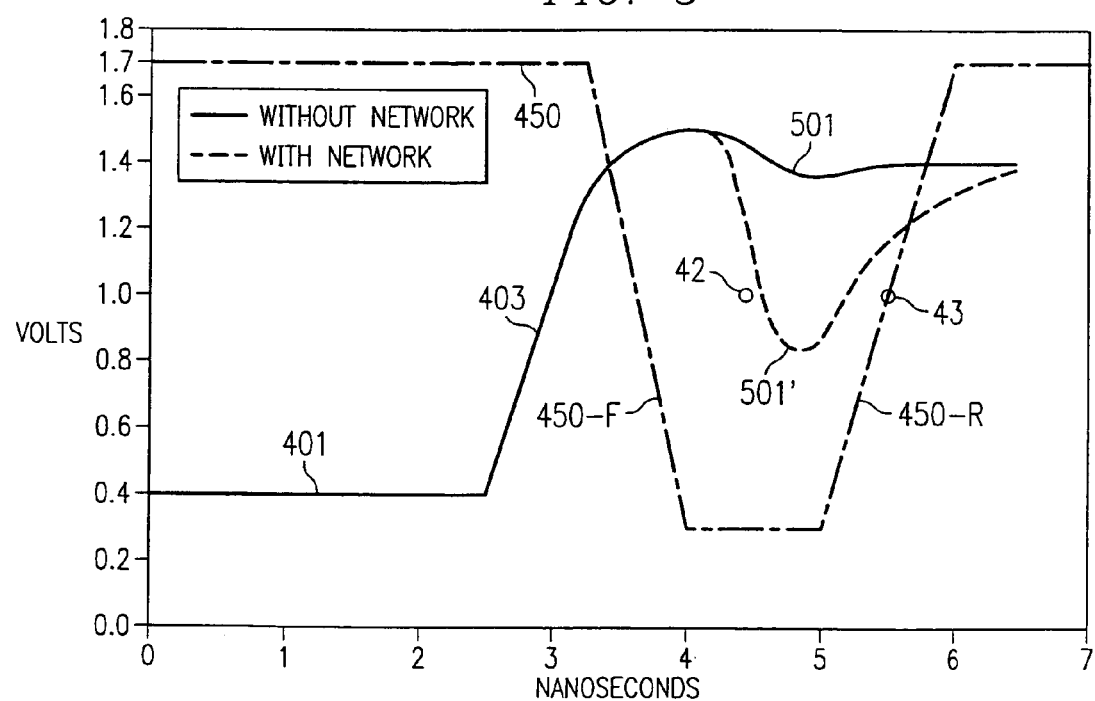
FIG. 5 shows the glitch waveform and the modified glitch waveform at the input of the receiver of the first semiconductor chip for a "0" to "1" situation.

A problem with any early reflection solution designed to suppress the bus turnaround glitch caused when chip 11 sends a zero followed by chip 12 sending a zero is that the same physical effect occurs when chip 11 sends a zero followed by chip 12 sending a one. This causes the one to be incorrectly received as a zero, as illustrated in FIG. 5. One solution to this problem is to design the bus protocol so that chip 12 is never required to send a one as the first bit after a turnaround when it receives a zero as the previous bit.

Turning now to FIG. 4, there is shown a theoretical graph (using the embodiment of FIG. 3) showing volts on the vertical axis and nanoseconds on the horizontal axis. FIG. 4 shows the situation that occurs when there is a zero from chip 11 followed by a zero from chip 12. It should be understood that FIG. 4 (and FIG. 5) are sketches showing the relative slopes of the various signals at the receiver of chip 11 and are not graphs taken from actual circuits. Line 450 shows a clock timing pulse which is high (1.7 volts) at time=0 to 3.25 nanoseconds and then falls, portion 450-F until 4 nanoseconds, stays flat at 0.4 volts and starts rising at 5 nanoseconds, portion 450-R until 5.75 nanoseconds.

For illustrative purposes only, let us assume that the cutoff between a high "1" and a low "0" is 0.9 volts. Let us also assume that the setup window is 1,000 picasaconds (1 nanosecond) wide as shown between points 42 and 43. The setup window is the time just prior to a sample being taken where the signal being sampled must be stable.

Let us assume that the signal from chip 11 was zero (0.4 volts) at time=0. Line 401 represents that signal from the period 0 nanoseconds through 2 nanoseconds. Shortly after 2 nanoseconds, the control is switched from chip 11 to chip 12. In a perfect world, since there was a zero online from chip 11 followed by a zero on the same line from chip 12, line 401 would continue, as shown by line 402.

However, because of the glitch created by the rising pulse from chip 11, line 403 is shown rising from 0.4 volts up to 1.4 volts at roughly 3.5 nanoseconds. At that point, the reflected signal causes the waveform to begin to fall, as shown by line 404. As discussed above, the window for the setup time is between points 42 and 43 as the clock rises through 0.9 volts. Thus, clearly, at the same time, line 404 is both above and below 0.9 volts during the setup window time, violating the required setup time, which most likely will cause chip 11 to receive the value incorrectly as a one.

Using the electrical network of FIG. 2 or FIG. 3, the result will be a quicker falloff time of the glitch as shown by line 404'. Note that line 404' is below 0.9 volts at all times during the window setup time. Accordingly, by using network 131 (FIG. 1) the circuit would register a zero (low) as it should even though a high glitch was on the line.

FIG. 5 shows a situation where the low from chip 11 is followed by a high from chip 12. In this situation, line 501 shows the reflected signal if there is no network present. In this situation, clearly a one would be detected, since line 501 is above setup window 42–43 at all times.

However, if electrical network 131 is being used, then the signal would behave as shown as line 501 prime and would dip through roughly 0.8 volts. Thus, during the setup window 42:43, the signal would appear unstable and, thus, would not read properly. However, the reason that this is not a problem in the circuit being discussed, is that there is in place a protocol which prevents a high from chip 12 from following a low from chip 11. Accordingly, the situation shown in FIG. 5 which could potentially be a problem, is not an issue when used with a protocol as discussed above.

While it is contemplated that both chips (circuits) are on the same board, this need not be the case. Also, the electrical network can be placed at other locations provided that the contained circuit elements are modified properly, in accordance with the teachings herein.

The illustrations herein are with respect to chip 11 transitioning from driving a zero to receiving a zero from chip 12. It should be understood that the same effect could occur on a transition from chip 12 driving a zero to chip 12 receiving a zero. Also, it should be understood that circuits with opposite biasing would behave the same way, such that a chip driving a one transitioning to receipt of a one could cause the same glitch (low instead of high). The concepts of this invention would cover these situations.

What is claimed is:

1. A method for advancing a valid data value with respect to an invalid data value when a bidirectional signal travels between a first semiconductor chip and a second semiconductor chip on a transmission line between the first semiconductor chip and the second semiconductor chip, the method comprising the steps of:

allowing said invalid data value signal to travel on said transmission line from said first semiconductor chip to said second semiconductor chip; and coupling a capacitor to said transmission line to create an impedance discontinuity between said chips.

2. The method of claim 1 wherein said capacitor is coupled to said transmission line near said second semiconductor chip.

3. A method to cause a false value to be correctly seen as the proper data value when a bidirectional signal travels between a first semiconductor chip and a second semiconductor chip on a transmission line between said chips, said false data value being the result of a signal value present at said first chip based on a signal value starting at said first chip and traveling to said second chip, the method comprising:

negatively reflecting said signal value from said first chip sooner than said signal value from said first chip by coupling components to said transmission line, wherein said negatively reflected signal value causes said false value to be correctly seen as said proper data value.

4. The method of claim 3 wherein said components are coupled to said transmission line near said second semiconductor chip.

5. The method of claim 3 wherein said coupled components impose an impedance discontinuity.

6. The method of claim 3 wherein said components are selected from a list including capacitors, inductors, resistors and transmission lines.

7. A circuit that allows a false data one to be correctly seen as a zero when a bidirectional signal travels between a first semiconductor chip and a second semiconductor chip on a transmission line placed between the first semiconductor chip and the second semiconductor chip, said false data one being the result of a signal level beginning at said first chip and traveling to said second chip, the device comprising:

an electrical network coupled to said transmission line, said chips electrical network arranged to cause a negative signal reflection of said signal level, wherein said negative signal reflection created by said electrical network causes said false data one to be seen correctly as said proper zero.

8. The circuit of claim 7 wherein said electrical network is coupled to said transmission line near said second semiconductor chip.

9. The circuit of claim 7 wherein said electrical network establishes an impedance discontinuity as seen by said signal level.

10. The circuit of claim 7 wherein said electrical network includes components selected from the list of capacitors, inductors, resistors and transmission lines.

11. A system having first and second circuits, said circuits interconnected by a transmission line, said circuit transmitting ones and zeros as data bits to each other from time to time, said first circuit applying a voltage glitch signal to said line during a transition from said first circuit being a driver of data values to said circuit becoming a receiver of data values from said second circuit, said glitch signal traveling from said first circuit toward said second circuit and said glitch signal being eliminated by the negative reflection from said second circuit said system comprising:

means at said first circuit for detecting data values appearing at said first circuit; and wherein the late arrival of said reflection causes a false data value to be detected at said first circuit when said second circuit transmits its first data bit; and means for modifying the time of the beginning of said negative reflection on said transmission line between said first and second circuits.

12. The system of claim 11 wherein said modifying means creates an impedance discontinuity resulting in said modified reflection time.

13. The system of claim 12 wherein said impedance discontinuity includes elements selected from the list including, capacitors, inductors, resistors and transmission lines.

14. A method for changing the reflection time of a bidirectional signal which travels between a first semiconductor chip and a second semiconductor chip on a transmission line between the first semiconductor chip and the second semiconductor chip, the method comprising the steps of:

allowing said bidirectional signal to travel on said transmission line from said first semiconductor chip to said second semiconductor chip; and coupling a capacitor to said transmission line to create an impedance discontinuity between said chips, wherein said signal reflection created by said impedance discontinuity causes a false data value to be seen correctly as a proper data value.

15. The method of claim 14 wherein said capacitor is coupled to said transmission line near said second semiconductor chip.

16. A circuit for adjusting the reflection time of a bidirectional signal traveling between a first semiconductor chip and a second semiconductor chip on a transmission line coupled between said chips, the circuit comprising:

an impedance discontinuity connected to said transmission line between said chips, wherein said signal reflection created by said impedance discontinuity causes a false data value to be seen correctly as a proper data value.

17. The circuit of claim 16 wherein said impedance discontinuity is caused by a capacitance circuit coupled to said transmission line near said second semiconductor chip.

18. The circuit of claim 17 wherein said capacitance circuit includes a transmission line separate from said transmission line between said chips.

* * * * *

UNITED STATES PATENT AND TRADEMARK OFFICE
CERTIFICATE OF CORRECTION

PATENT NO. : 7,142,006 B2
APPLICATION NO. : 10/640538
DATED : November 28, 2006
INVENTOR(S) : Dean T. Lindsay et al.

Page 1 of 1

It is certified that error appears in the above-identified patent and that said Letters Patent is hereby corrected as shown below:

In column 6, lines 11-12, in Claim 7, after "transmission" delete "line, said chips" and insert -- line between said chips, said --, therefor.

Signed and Sealed this

Twenty-second Day of December, 2009

David J. Kappos
*Director of the United States Patent and Trademark Office*